Z. Parkhurst,
Burring Wool.
No. 101,763. Patented Apr. 12. 1870.

Witnesses
S. N. Piper.
J. R. Snow.

Ziba Parkhurst
by his attorney,
R. H. Eddy

United States Patent Office.

ZIBA PARKHURST, OF MILFORD, MASSACHUSETTS.

Letters Patent No. 101,763, dated April 12, 1870.

IMPROVEMENT IN MACHINE FOR BURRING AND CLEANING WOOL, &c.

The Schedule referred to in these Letters Patent and making part of the same.

*To all persons to whom these presents may come:*

Be it known that I, ZIBA PARKHURST, of Milford, of the county of Worcester and State of Massachusetts, have made a new and useful invention of certain new and useful improvements having reference to Machinery for Burring and Cleaning Wool, Cotton, or other Fibrous Material; and I do hereby declare the same to be fully described in the following specification, and represented in the accompanying drawings, of which—

Figure 1:
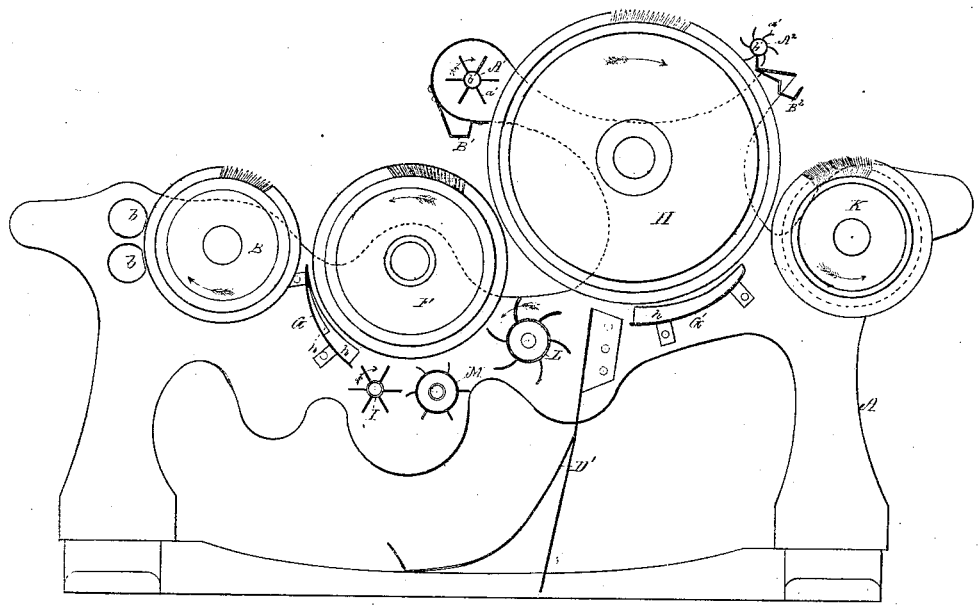

Figure 1 denotes a longitudinal section of a machine containing my present improvements.

This machine is of the character of that represented in Letters Patent No. 94,437, dated August 31, 1869, and granted to me.

In such drawings—

A denotes the frame of the machine, there being at the rear end thereof a pair of feed-rollers, b b, disposed with a receiving card-cylinder, B, in manner as represented.

In advance of the cylinder B is another card-cylinder, termed the "tumbler," which is denoted by the letter F.

The main card-cylinder is shown at H, having in its front a doffer card-cylinder, K, these several card-cylinders being to perform the functions of like cylinders shown in the drawings, and described in the specification of the said patent.

There is arranged between the cylinder B and F a series of oblique ribs, h h, fixed on a stationary curved plate, G.

Figure 2:
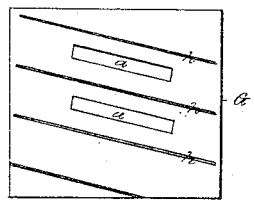

A top view of such plates and ribs is exhibited in Figure 2, in which it will be seen that there is a long slot, a, between each two of the ribs.

Another such slotted plate, marked G', and series of oblique ribs, are arranged underneath the main card-cylinder and to operate therewith.

The plate G' and series of oblique ribs are substantially like the bar G and oblique ribs h described in my said patent, except that the plate on which the ribs are fixed and supported is curved and slitted, as described, and that the ribs themselves are curved and tapered, such being for the purpose of better discharging the dirt and extraneous matters detached by the ribs.

Over the main card-cylinder H, I employ one or more rotary beaters, A¹ A², each being provided with a trough, arranged as shown at B¹ B².

Each of these beaters consist of a series of straight or curved wings or plates, a', extended in radial directions from a shaft, b'.

The purpose of each of these rotary beaters and their troughs is to remove from the main cylinder any burs or seed or other matters which usually project therefrom, and to catch such, so as to prevent them from falling upon the next adjacent card-cylinders.

From the rear part of the main card-cylinder I extend down, or nearly down, to the floor a partition, D', which I either make straight, or construct it with a curve, so as to serve as a trough to catch the matters which may be thrown down in rear of it.

The drawing represents the partition as formed in either way.

The purpose of the partition is to prevent the filaments of wool discharged downward from the main card-cylinder from being blown back by the wind therefrom, in among the refuse material discharged from the tumbler.

Underneath the tumbler I arrange, to operate with it, a series of rotary beaters, L, M, and I.

I generally serrate every other wing of the rearmost beater.

The machine hereinbefore described I usually term a bur, dirt, and rag extractor, its purpose being to remove from wool, cotton, or what is termed "shoddy," the extraneous matters, such as dirt, seed or rags.

In the above-described machine the plate G is curved, and each of the oblique ribs is curved and tapered vertically, as shown in the drawings. This not only causes the ribs to fit evenly to the cylinder over them, but gradually increases the width of the discharging space between such cylinder and plate.

By this improvement the waste is not only taken from the cylinder, but is discharged to better advantage than would be the case were the ribs straight as in my patent aforesaid.

Furthermore, the wool caught by the ribs has a chance to pass to better advantage toward the transferring beater I, on which it will be caught and thrown back upon the cylinder F, or in the carrier M, which is to be revolved at a slower speed than either of the beaters I and L.

It transfers the filaments, caught from each of the beaters I and L, back to the cylinder F, and drops the waste into the troughed partition D.

The cylinder or beater L acts as a blower and a picker, as it picks from the cylinder F the waste knobs or pieces of cloth, and blows them, with the waste filaments detached, upon the cylinder M, which restores the filaments to the cylinder F.

The blast of the cylinder L operates to free the beaters I and M from the useless waste matters.

The great advantages of the slots a in the ribbed plate are that they discharge from the usable filaments detached by the ribs, most, if not all the superfluous waste matters, and thereby prevent such from being thrown upon the carrier I, and by it thrown back upon the cylinder F.

The blades or wings of the beater M, as well as those of the beater L, except such thereof as may be serrated, are to be sharp on their edges, so as cause them to act like knives to cut from the fibers the rags or useless waste matters extended from the tumbler F.

In the above-described machine, I claim as follows:

1. The curved plate G, provided with the obliquely-set, curved, and tapered ribs, having oblique slots arranged between them, as set forth.

2. The combination and arrangement of the partition D', with the cylinders F and H, or F, H, and K, and one or more beaters I M L, arranged as specified.

3. The arrangement and combination of the curved plate G, constructed as described, with oblique slots $a$ and tapering, curved, and obliquely-set ribs $h$, with the transferring beater I and the cylinders B and F, as set forth.

4. The combination with the cylinders F and H, provided with the plates G G', constructed as described, and the beaters I and M, of the beater L, having serrated and plain wings arranged thereon, as and for the purpose specified.

ZIBA PARKHURST.

Witnesses:
R. H. EDDY,
J. R. SNOW.